United States Patent [19]

Schmidt et al.

[11] Patent Number: 4,537,949
[45] Date of Patent: Aug. 27, 1985

[54] CONTINUOUS PREPARATION OF NYLON WITH DIAMINE RECYCLING

[75] Inventors: Franz Schmidt, Mannheim; Gunter Pipper, Bad Durkheim; Josef G. Floss, Neustadt; Franz Zahradnik, Ludwigshafen, all of Fed. Rep. of Germany

[73] Assignee: BASF Aktiengesellschaft, Fed. Rep. of Germany

[21] Appl. No.: 620,563

[22] Filed: Jun. 14, 1984

[30] Foreign Application Priority Data

Jun. 15, 1983 [DE] Fed. Rep. of Germany ....... 3321581

[51] Int. Cl.³ ............................................. C08G 69/28
[52] U.S. Cl. ..................................... 528/335; 526/65; 526/68
[58] Field of Search ..................... 528/335; 526/65, 68

[56] References Cited

U.S. PATENT DOCUMENTS

| | | | |
|---|---|---|---|
| 3,269,990 | 8/1966 | Wiloth et al. | 260/78 |
| 3,296,217 | 1/1967 | Tate | 260/78 |
| 3,900,450 | 8/1975 | Jaswal et al. | 260/78 |
| 3,948,862 | 4/1976 | Iwasyk | 260/78 |
| 4,019,866 | 4/1977 | Jaswal et al. | 23/260 |

*Primary Examiner*—Harold D. Anderson
*Attorney, Agent, or Firm*—Keil & Weinkauf

[57] ABSTRACT

Nylons are prepared by a continuous process in which, in an evaporator zone, an aqueous solution of a salt of a dicarboxylic acid of 6 to 18 carbon atoms and a diamine of 6 to 18 carbon atoms is heated to 250°–300° C. under superatmospheric pressure, with simultaneous vaporization of water and formation of a prepolymer, the prepolymer and the vapors are separated continuously, the vapors are rectified and the entrained diamines are recycled, and the prepolymer is fed to a polycondensation zone and subjected to polycondensation under superatmospheric pressure of from 1 to 10 bar and at from 250° to 300° C., wherein the aqueous salt solution is heated under superatmospheric pressure of from 1 to 10 bar during a residence time of less than 60 seconds, with the proviso that, on leaving the evaporator zone, the degree of conversion is not less than 93% and the water content of the prepolymer is not more than 7% by weight.

10 Claims, No Drawings

CONTINUOUS PREPARATION OF NYLON WITH DIAMINE RECYCLING

A number of processes for the preparation of nylons from salts of dicarboxylic acids and diamines, eg. nylon-6,6 salt, are known. German Published Application DAS No. 1,162,562 describes a process in which the aqueous solution of nylon-6,6 salt is first heated to a temperature below the boiling point under from 18 to 50 atm gage pressure, the heated solution is fed under the surface of a nylon melt, and water is separated off. In another process, disclosed in German Laid-Open Application DOS No. 1,570,932, the aqueous nylon-6,6 salt solution is first preheated without vaporization and is fed into the lower part of a column, water is evaporated, and the resulting salt melt is condensed in a downstream zone. The vapors produced in this procedure are rectified in the upper part of the column and the entrained diamines are recycled. German Laid-Open Application DOS No. 2,410,474 describes a process in which an aqueous solution of nylon-6,6 salt is fed into a nylon melt, and the mixture is heated in a heat exchanger, with formation of vapor, and is passed into the lower part of a column, where vapor and prepolymer separate. The prepolymer condenses at the bottom of the column, and some of it is recycled. The vapors are rectified in the upper part of the column, and the diamines present in them are recycled.

U.S. Pat. No. 3,948,862 discloses a process in which the condensation is carried out in a widening tube which is divided, by means of valves, into zones which may furthermore contain baffles. How the content of triamines can be reduced is not stated.

The prior art processes are in need of further improvement. It has been found that the formation of triamines, eg. dihexamethylenetriamine from hexamethylenediamine, has an adverse effect on the quality of the polymer. The quality of the nylons have to meet steadily increasing requirements as a result of the further development of spinning technology. In particular, it is desirable to minimize changes in viscosity during processing, which are caused by the presence of triamines, and to reduce breaks and knot formation during spinning. This also results in an improvement in the drawing yield and the strength of the filaments produced.

It is an object of the present invention to provide a continuous process for the preparation of nylons which gives nylons which, when processed to filaments, exhibit an improvement in respect of breaking, knot formation and achievable draw ratio and strength of the filaments. It is a particular object of the present invention to keep the formation of triamines during the polycondensation, and the vaporization of diamines, to a minimum.

We have found that this object is achieved by a process for the continuous preparation of nylons, in which, in an evaporator zone, an aqueous solution of a salt of a dicarboxylic acid of 6 to 18 carbon atoms and a diamine of 6 to 18 carbon atoms is heated to 250°–300° under superatomspheric pressure, with simultaneous vaporization of water and formation of a prepolymer, the prepolymer and the vapors are separated continuously, the vapors are rectified and the entrained diamines are recycled, and the prepolymer is fed to a polycondensation zone and subjected to polycondensation under superatmospheric pressure of from 1 to 10 bar and at from 250° to 300° C., wherein the aqueous salt solution is heated under superatmospheric pressure of from 1 to 10 bar during a residence time of less than 60 seconds, with the proviso that, on leaving the evaporator zone, the degree of conversion is not less than 93% and the water content of the prepolymer is not more than 7% by weight.

The novel process has the advantage that the formation of triamines and the vaporization of diamines are minimized. Another advantage of the novel process is that higher-quality nylons are obtained, and there is an improvement in respect of breaking, knot formation, achievable draw ratio and strength when the nylons are processed to filaments.

In accordance with the invention, an aqueous solution of a salt of a dicarboxylic acid of 6 to 18 carbon atoms and a diamine of 6 to 18 carbon atoms is used.

An aqueous solution of a salt of an $\alpha,\omega$-alkanedicarboxylic acid of 6 to 12 carbon atoms and an $\alpha,\omega$-alkanediamine of 6 to 12 carbon atoms, particularly one which has a straight carbon chain, is preferable used as the starting material. Examples of suitable dicarboxylic acids are azelaic acid, adipic acid, suberic acid, sebacic acid, decanedicarboxylic acid, terephthalic acid and naphthalenedicarboxylic acid. Preferred $\alpha,\omega$-alkanedicarboxylic acids have 6 to 10 carbon atoms.

Examples of suitable diamines are hexamethylenediamine, octamethylenediamine, decamethylenediamine, bis(4-aminocyclohexyl)-methane, bis(4-amino-3-methylcyclohexyl)methane and 2,2-bis(4-aminocyclohexyl)propane. Preferred $\alpha,\omega$-alkanediamines have 6 to 10 carbon atoms.

Nylon-6,9, nylon-6,10 and nylon-6,12 salts, and especially nylon-6,6 salts, have become particularly important. The aqueous solution used contains as a rule from 30 to 70, in particular from 50 to 65, % by weight of the salt. The dicarboxylic acid and the diamine are of course present in the salt essentially in equivalent amounts. It is also possible concomitantly to use lactams, in particular caprolactam, as a monomer in order to produce a nylon copolymer.

According to the invention, the aqueous salt solution is advantageously passed continuously into an evaporator zone, at from 50° to 100° C. In this zone, the said solution is heated at 250°–300° C. under superatmospheric pressure of from 1 to 10 bar, with simultaneous evaporation of water and formation of a prepolymer. Advantageously, superatmospheric pressure of from 2 to 6 bar is applied and heating is carried out at from 270° to 290° C. The temperature employed must of course be above the melting point of the particular polymer being prepared.

An essential feature of the invention is that a residence time of not more than 60, eg. from 10 to 55, seconds, is maintained in the evaporator zone, a residence time of from 10 to 40 seconds having proven particularly useful. Another essential feature is that, on leaving the evaporator zone, the resulting prepolymer has a degree of conversion of not less than 93%, in particular from 95 to 98%, and furthermore has a water content of not more than 7, preferably from 2 to 5, % by weight.

The evaporator zone is advantageously in the form of a tube bundle. Tube bundles which have been found to be particularly advantageous are those in which the individual tubes have periodically repeating tubular and slot-like cross-sections.

Furthermore, it has proven advantageous to pass the mixture of prepolymer and vapor, before separation of the phases, through a tubular mass transfer zone which is located directly downstream from the evaporator zone and is provided with baffles. The temperatures and pressure conditions employed in the evaporator zone are also maintained in this zone. The baffles, for example packings, such as Raschig rings, metal rings or, in particular, wire net, have a large surface area, which brings the phases, ie. the prepolymer and the vapor, into intimate contact. The result of this is that the amount of diamine liberated with the steam is substantially reduced. As a rule, a residence time of from 1 to 15 minutes is maintained in the mass transfer zone, which is advantageously in the form of a tube bundle.

The two-phase vapor/prepolymer mixture which emerges from the evaporator zone or mass transfer zone is separated. Separation takes place spontaneously as a result of the physical differences in a vessel, the lower part of the vessel advantageously being in the form of a polymerization zone. The vapors obtained essentially consist of steam and diamines, which are released when the water is vaporized. These vapors are passed into a column and rectified. Examples of suitable columns are packed columns, bubble-tray columns or sieve-tray columns containing from 5 to 15 theoretical plates. The column is advantageously operated under the same pressure conditions as the evaporator zone. The diamines present in the vapors are separated off in this column, and are recycled to the evaporator zone. It is also possible to feed the diamines to the downstream polymerization zone. The rectified steam is taken off at the top of the column.

Depending on its degree of conversion, the resulting prepolymer essentially consists of a low molecular weight nylon, with or without residual amounts of unreacted salts, and as a rule has a relative viscosity of from 1.2 to 1.7. This prepolymer is fed into a polymerization zone, and the melt obtained in this zone is subjected to polycondensation at from 250° to 300° C., in particular from 270° to 290° C., and under superatmospheric pressure of from 1 to 10, in particular from 2 to 6, bar. Advantageously, the vapors liberated in this zone are rectified in the column, together with the vapors mentioned above. The residence time in the polycondensation zone is preferably from 5 to 30 minutes. The nylon thus obtained generally has a relative viscosity of from 1.2 to 2.3, and is discharged continuously from the condensation zone.

In a preferred procedure, the nylon thus obtained is passed, in the form of a melt, through a discharge zone, the residual water present in the melt being removed simultaneously. Examples of suitable discharge zones are devolatilizing extruders. The melt which has been freed in this way from water is then extruded and granulated. The resulting granules are condensed, advantageously in the solid phase using superheated steam, at below the melting point, eg. from 170° to 225° C., until the desired viscosity is obtained. It is advantageous to use the steam obtained at the top of the column for this purpose.

In another preferred procedure, the nylon melt discharged from the polycondensation zone is passed into a further polycondensation zone where it is condensed with continuous formation of new surfaces, at from 270° to 290° C., advantageously under reduced pressure, eg. from 1 to 500 mbar, until the desired viscosity is obtained. Suitable apparatuses are known as finishers.

Conventional additives, such as dulling agents, eg. titanium dioxide, or stabilizers can be fed to the aqueous salt solution, for example as a suspension in water, at the entrance to the evaporator zone, or in the form of a concentrate during the further course of the polycondensation.

The nylons prepared by the process of the invention are useful for the production of filaments, fibers, films and shaped articles.

The Examples which follow illustrate the process according to the invention.

EXAMPLE 1

A 62% strength by weight aqueous solution of nylon-6,6 salt is fed from a heated storage vessel into a tubular evaporator by means of a metering pump, at about 80° C. and at a rate corresponding to 5 kg/hour of nylon, the said evaporator having horizontal and vertical sections. The evaporator is heated by vigorously circulating a liquid heating medium, which is at 285° C. The evaporator is 3 m long and has a capacity of 180 ml and a heat transfer surface of about 1,300 $cm^2$. The residence time in the evaporator is 50 seconds. The mixture of prepolymer and steam which emerges from the evaporator is at 280° C., and is separated in a separator into steam and a melt. The melt remains in the separator for a further 10 minutes and is then extruded by means of an extruder having a devolatilizing zone, and is solidified in a water bath and then granulated. The separator and the evaporator zone are kept under 5 bar by means of a pressure regulating apparatus located downstream from the column. The steam separated off in the separator is fed to a packed column which has about 10 theoretical plates and to the top of which about 1 liter/hour of vapor condensate is fed to produce a reflux. A temperature of 152° C. is established at the top of the column. The steam emerging downstream from the pressure-relief valve is condensed. It contains less than 0.05% by weight of hexamethylenediamine. This bottom product of the column is an aqueous solution of hexamethylenediamine which contains from 12 to 15%, based on nylon produced, of hexamethylenediamine. This solution is recycled to the starting salt solution by means of a pump, being introduced into the said salt solution before the latter enters the evaporator.

Downstream from the evaporator, the prepolymer has a relative viscosity of 1.25, measured in 98% strength by weight sulfuric acid at 20°, and its conversion is from 93 to 95%, according to terminal group analysis. The content of bishexamethylenetriamine is from 0.05 to 0.1%, based on nylon.

After the polymer melt has emerged from the separator, the nylon has a very pale intrinsic color, an extremely low bishexamethylenetriamine content of 0.15%, and a relative viscosity of 1.91, and its ratio of the number of equivalents of terminal COOH groups to the number of equivalents of terminal $NH_2$ groups is 109:107. The range of variation of the terminal groups is small.

In the extruder, the melt is let down to atmospheric pressure, and virtually no further condensation takes place during a residence time of less than 1 minute. The resulting granules are condensed by continuous solid-phase condensation with superheated steam at 182° C. during a residence time of 12 hours, until the final viscosity $\eta$ rel is 2.50.

EXAMPLE 2

A 62% strength by weight nylon-6,6 salt solution at about 80° C. is introduced from above into a vertical evaporator which has a length of 2 m, a capacity of 120 $cm^3$ and a heat transfer surface of about 860 $cm^2$. The evaporator is heated by means of a vigorously circulated liquid heating medium at 285° C. The mixture of prepolymer and steam which emerges from the evaporator is at 278° C., and the degree of conversion is 94%. The residence time in the evaporator is about 40 seconds. The said mixture is passed into a mass transfer zone which contains packing and has a surface area of 2 m². The mass transfer zone is such that no significant heat transfer occurs, and the prepolymer melt is brought into intimate contact with the steam. The residence time in this zone is 0.5 minute. After passing through the mass transfer zone, the mixture of prepolymer and steam is separated in a separator by a procedure similar to that described in Example 1. The further course of the process corresponds to the procedure described in Example 1. The resulting nylon contains 0.15% of bishexamethylenetriamine, while the bottom product of the column contains only from 2 to 3%, based on nylon, of hexamethylenediamine.

We claim:

1. A process for the continuous preparation of a nylon, which comprises
   (a) passing an aqueous solution of a salt of a dicarboxylic acid of 6 to 18 carbon atoms and a diamine of 6 to 18 carbon atoms through an evaporator zone, a residence time of not more than 60 seconds being maintained,
   (b) heating the aqueous solution in the evaporator zone to 250°–300° C. under superatmospheric pressure of from 1 to 10 bar, with evaporation of water, and not less than 93% conversion of the salt to form a vapor phase mixed with a prepolymer containing not more than 7% by weight of water,
   (c) separating off the prepolymer from the vapor phase,
   (d) transferring the prepolymer to a condensation zone,
   (e) condensing the prepolymer in the condensation zone under superatmospheric pressure of from 1 to 10 bar and at from 250° to 300° C., and
   (f) rectifying the vapor obtained in stage (c) in a column, with separation into steam and diamine, and recycling of the diamine to stage (a).

2. A process as claimed in claim 1, wherein a residence time of from 10 to 40 seconds is maintained in the evaporator zone.

3. A process as claimed in claim 1, wherein the conversion of the product emerging from the evaporator zone is from 95 to 98%.

4. A process as claimed in claim 1, wherein the water content of the prepolymer is from 2 to 5% by weight.

5. A process as claimed in claim 1, wherein the aqueous salt solution is heated to 270°–290° C. in the evaporator zone.

6. A process as claimed in claim 1, wherein the evaporator zone is alternately tubular and slot-like.

7. A process as claimed in claim 1, wherein the mixture of prepolymer and vapor is fed through a mass transfer zone provided with baffles, before separation of the phases takes place.

8. A process as claimed in claim 1, wherein the nylon, in the form of a melt, is passed from the polycondensation zone through a discharge zone with removal of water, and is granulated, and then condensed in the solid phase until the desired viscosity is obtained.

9. A process as claimed in claim 1, wherein the nylon discharged in the form of a melt from the polycondensation zone is condensed in a further condensation zone, with continuous formation of new surfaces, until the desired viscosity is obtained.

10. A process for the preparation of a nylon, which comprises
    (a) passing an aqueous solution of a salt of a dicarboxylic acid of 6 to 18 carbon atoms and a diamine of 6 to 17 carbon atoms through an evaporator zone, a residence time of from 10 to 40 seconds being maintained,
    (b) heating the aqueous solution in the evaporator zone to 250°–300° C. under superatmospheric pressure of from 1 to 10 bar, with the formation of a mixture of a vapor phase of, and not less than 93% conversion of the salt and a prepolymer containing not more than 7% by weight of water,
    (c) separating off the prepolymer from the vapor phase,
    (d) transferring the prepolymer to a condensation zone,
    (e) condensing the prepolymer in the condensation zone under superatmospheric pressure of from 1 to 10 bar and at from 250° to 300° C.,
    (f) rectifying the vapor obtained in stage (c) in a column, with separation into steam and diamine, and recycling of the diamine to stage (a), and
    (g) discharging the nylon obtained in stage (e) through a discharge zone with removal of water, cooling and comminuting the nylon, and condensing the nylon in the solid phase, with the steam separated off in stage (f), until the desired viscosity is obtained.

* * * * *

UNITED STATES PATENT AND TRADEMARK OFFICE
CERTIFICATE OF CORRECTION

PATENT NO. : 4,537,949
DATED : August 27, 1985
INVENTOR(S) : Schmidt et al.

It is certified that error appears in the above—identified patent and that said Letters Patent is hereby corrected as shown below:

In claim 10, Column 6, line 26, "17" should read --18--.

Signed and Sealed this

Seventeenth Day of December 1985

[SEAL]

Attest:

DONALD J. QUIGG

Attesting Officer     Commissioner of Patents and Trademarks